US006999388B2

(12) United States Patent
Mashimo et al.

(10) Patent No.: US 6,999,388 B2
(45) Date of Patent: Feb. 14, 2006

(54) OPTICAL DISK APPARATUS

(75) Inventors: Akira Mashimo, Tokorozawa (JP); Chisato Takayama, Nishitokyo (JP); Keishi Ueno, Iruma (JP)

(73) Assignee: TEAC Corporation, Musashino (JP)

( * ) Notice: Subject to any disclaimer, the term of this patent is extended or adjusted under 35 U.S.C. 154(b) by 512 days.

(21) Appl. No.: 10/131,974

(22) Filed: Apr. 24, 2002

(65) Prior Publication Data

US 2002/0159345 A1 Oct. 31, 2002

(30) Foreign Application Priority Data

Apr. 26, 2001 (JP) ............................ 2001-130186

(51) Int. Cl.
*G11B 7/00* (2006.01)

(52) U.S. Cl. .............................. 369/44.29; 369/47.25; 369/59.22

(58) Field of Classification Search ............... 369/47.1, 369/59.2, 44.27, 44.29, 44.34, 47.35, 59.22, 369/44.28, 44.35, 47.25
See application file for complete search history.

(56) References Cited

U.S. PATENT DOCUMENTS

| | | | |
|---|---|---|---|
| 6,167,010 A | 12/2000 | Shimada et al. | |
| 6,477,125 B1 * | 11/2002 | Hayami | 369/59.22 |

FOREIGN PATENT DOCUMENTS

| | | |
|---|---|---|
| JP | 10-069657 | 3/1998 |
| JP | 10-214458 | 8/1998 |
| JP | 11-086302 | 3/1999 |

* cited by examiner

*Primary Examiner*—Nabil Hindi
(74) *Attorney, Agent, or Firm*—Christensen O'Connor Johnson Kindness PLLC

(57) ABSTRACT

An optical disk apparatus capable of adjusting a focus servo and the like by precisely detecting a jitter amount. Light reflected from an optical disk is converted into an RF signal in an optical pickup and amplified by an RF amplifier before being supplied to an equalizer. The boost amount of the equalizer is set to zero during adjustment and set to a predetermined finite value (e.g., +20 dB) during normal recording and reproducing. By first setting the boost amount to zero, the delay characteristics of the RF signal from 3T to 11T are flattened such that an accurate jitter amount can be determined based on the integrated value of the phase differences of 3T to 11T, thereby allowing the optical pickup to be adjusted so as to minimize the jitter amount.

6 Claims, 5 Drawing Sheets

OPTICAL DISK APPARATUS

BACKGROUND OF THE INVENTION

1. Field of the Invention

The present invention relates to an optical disk apparatus, and particularly to a technique for performing a gain adjustment using an equalizer on an RF signal read by an optical pickup.

2. Description of the Related Art

Related Art

Optical disk apparatuses for driving an optical disk, such as a CD (compact disk), a CD-R (compact disk-recordable), a CD-RW (compact disk-rewritable) and a DVD (digital versatile disk), are known. An optical disk apparatus reproduces data recorded on a disk by irradiating laser light onto the disk from an LD (laser diode) and converting the light reflected from the optical disk surface into an electric signal (RF signal). When the recording density per unit area is increased in such systems, such optical disk apparatuses suffer from a problem that signal amplitudes are reduced, especially in a high frequency region (near 3T), and the error rate therefore increases.

Thus, the RF signal supplied from an optical pickup is processed to remove noise by cutting signal components beyond a prescribed range of frequency bands using a low-pass filter, and in turn the resultant signal is processed so as to increase (boost) a gain in a high frequency region near 3T using an equalizer.

FIG. 4 shows frequency characteristics of one such equalizer. Referring to FIG. 4, the frequency is plotted on the horizontal axis and the gain is plotted on the vertical axis. In the equalizer, a gain is set to a certain value for increasing amplitudes near a 3T frequency $f_{3T}$.

The RF signal with the gain adjusted by the equalizer is digitized by a digitizing circuit and provided therefrom as a reproduced signal. The digitized signal is subjected to processing for detection of a jitter component, and the result is sent to a control unit such as a CPU. The control unit functions to perform offset adjustment of a focusing servo and a tracking servo so as to minimize the jitter amount (phase difference).

The jitter amount is detected by generating a clock signal synchronized with the signal from the digitizing circuit using a PLL (phase-lock loop) circuit, and integrating or summing the phase difference between the components (3T to 11T) contained in the digitized signal and the clock signal.

As explained above, it is possible to increase a signal amplitude by boosting the RF signal near the 3T frequency by use of the equalizer and to reduce the error rate during reproducing. However, such boosting contributes to a time delay near the 3T, thereby an additional phase difference corresponding to the delay is caused and added to the original jitter amount. Thus the problem remains that the amount of jitter cannot be precisely detected, even if the phase difference between each component in the range of 3T to 11T of the digitized signal and the clock signal is integrated, and optimal adjustment of an offset amount of the focusing and/or tracking servo therefore remains impossible.

FIG. 5 shows the relationship between the offset amount and jitter amount of a focusing servo (FS) in cases when an RF signal is boosted and when not boosted. Referring to FIG. 5, the FS offset amount is plotted on the horizontal axis and the jitter amount is plotted on the vertical axis. A solid line represents the characteristic when the RF signal is boosted by the equalizer, while a dotted line represents the characteristic when not boosted. The integrated value of the phase differences of the all T components (in the range of 3T to 11T) presents a characteristic curve like a quadratic function which is symmetry with respect to the FS offset amount, and thus the FS offset amount that minimizes the jitter amount can be easily determined by calculating the intermediate value between the two points having a generally equal jitter amount to each other. In contrast, when the RF signal is boosted near the 3T component, the symmetry is lost, and, even if the intermediate value between the two points having a generally equal jitter amount is calculated, the FS offset amount which minimizes the jitter amount is not necessarily obtained and a deviation δ (about 0.3 μm) may occur. Accordingly, the FS offset amount cannot be set to its optimum value, and there arises a problem that the laser power must still be increased in order to correct the deviation of the focusing servo.

SUMMARY OF THE INVENTION

It is thus an object of the present invention to provide an optical disk apparatus which is capable of easily adjusting an optical pickup so as to minimize jitter, such that recording and reproduction characteristics are improved.

The optical disk apparatus according to the present invention comprises an optical pickup for irradiating laser light onto an optical disk, receiving the light reflected from the optical disk, and generating an RF signal in response to the received light; an equalizer for performing a gain adjustment on a predetermined frequency band of the RF signal received from the optical pickup; and a digitizing unit for digitizing the signal received from the equalizer, and a detector for detecting a jitter of the digitized signal received from the digitizing unit. The gain amount in the equalizer can be switched between two levels, a predetermined value (boosted) and a substantially zero value (not boosted). When servo adjustments, specifically an offset amount adjustment of a focusing servo or a tracking servo are necessary, the gain amount of the equalizer is set to a substantially zero value to flatten the delay characteristics of the RF signal for all Ts thereof, such that jitter can be precisely detected. On the other hand, when data is recorded on the optical disk or when data recorded on the optical disk is reproduced, the gain of the equalizer is set to a predetermined value, for example, +20 dB, whereby stable decoding is achieved. Rather than specifying a fixed value, the gain value of the equalizer is switched according to whether the device is performing servo adjustment or recording/reproducing, thereby enabling adaptive accommodation of both servo adjustment and recording/reproducing. When detecting jitter during the servo adjustment by setting the gain value to a substantially zero value, jitter may be detected for all Ts of the digitized signal or may be detected only for a 3T component where jitter is likely to occur and where the signal is most difficult to reproduce. Then, the offset amount which minimizes the detected jitter becomes the optimum offset value which is used for recording/reproducing. Here, the expression that the gain amount of the equalizer is a substantially zero value means that small values other than zero, for example, in a range from about 0 dB to +2 dB, may be included. The significance that the gain of the equalizer is set to a substantially zero value is in that the delay characteristics of the RF signal is flattened, and therefore any gain which results in flat delay characteristics is within the range of the present invention.

The present invention will be more clearly understood with reference to the following examples.

DESCRIPTION OF THE PREFERRED EMBODIMENT

A preferred embodiment of the invention will be described below with reference to the drawings.

Figure 1:
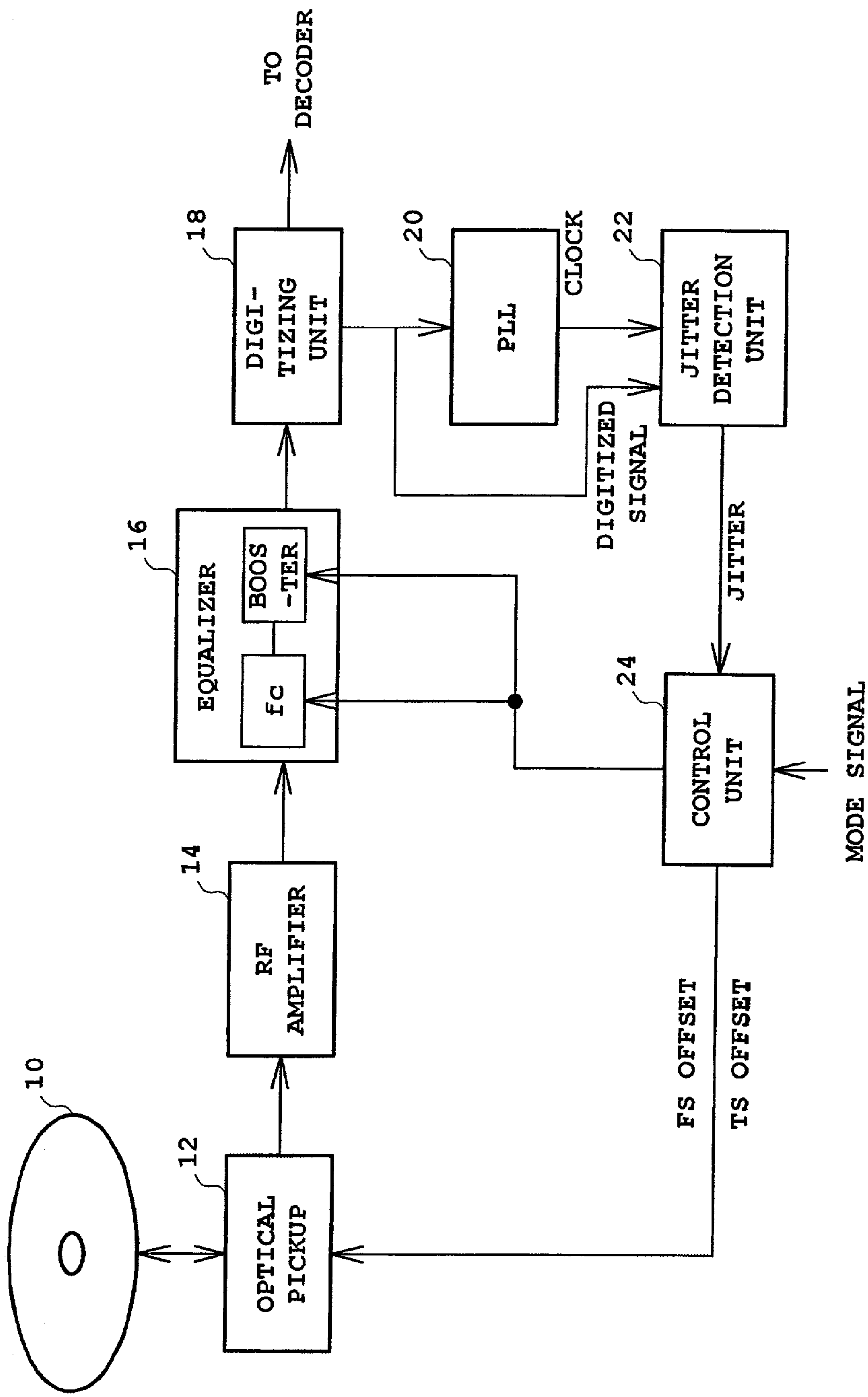
FIG. 1 is a block diagram showing a configuration according to an embodiment of the present invention.

FIG. 1 shows a block diagram showing a configuration of an optical disk apparatus of the present invention. An optical disk 10, such as a CD, a CD-R, a CD-RW, a DVD, or the like, is rotationally driven at a constant linear velocity (CLV) or at a CAV (Constant Angular Velocity) by a driver not shown in the diagram.

An optical pickup 12 contains a laser diode (LD) for irradiating a laser beam onto the optical disk and a photodetector for receiving the laser beam reflected from the optical disk, and converts the reflected light into an RF signal and outputs the resultant signal. If the optical disk 10 is a recordable media such as a CD-R, data is recorded by forming pits on the surface of the optical disk 10 by irradiating a more powerful laser beam from an LD during recording than during playback. The optical pickup 12 comprises a focusing actuator for driving an objective lens in a vertical direction with respect to the surface of the optical disk 10, and a tracking actuator for driving the objective lens in a tracking direction, both of which are subjected to tracking control and focus control under the control of a servo circuit, respectively. The servo circuit is supplied with error signals from a focusing error detection circuit (not shown) and a tracking error detection circuit (not shown) and executes control based on these supplied error signals.

An RF amplifier 14 amplifies a reproduction RF signal received from the optical pickup 12 and supplies the amplified signal to an equalizer 16.

The equalizer 16 comprises a low-pass filter for cutting a high frequency component beyond a cut-off frequency fc range as noise, and a booster for boosting a high frequency region (near 3T) of the RF signal received from the low-pass filter. In a conventional equalizer, a boosting amount provided by the boosting unit is set to a predetermined value, and a region near 3T of an RF signal is uniformly boosted. In the present embodiment, in contrast, the boosting amount (that is, a gain amount) in the booster is adjustable. Specifically, a boosting amount is set using a register value, and resetting of this register value enables changing of the boost amount in 1 dB increments within a range of 0 dB to 20 dB. The boosting amount of the equalizer 16 and the cutoff frequency fc of the low-pass filter are both controlled to be switched on the basis of a signal from a control unit 24 such as a CPU. The switching control by the control unit will now be described in greater detail. The RF signal appropriately boosted by the equalizer is supplied to a digitizing unit 18.

The digitizing unit 18 digitizes the RF signal received from the equalizer 16 into a sequence of binary symbols: 1 and 0, and supplies the digitized signal to a PLL (phase-locked loop) 20. The digitized signal is then provided to a decoder as a reproduction data from the optical disk 10 and decoded therein.

The PLL 20 generates a clock signal having a phase synchronized with the digitized signal, and supplies the clock signal to a jitter detection unit 22.

The jitter detection unit 22 receives the digitized signal (data signal) from the digitizing unit 18 and a clock signal from the PLL 20, and detects the phase difference, i.e. the jitter amount, between the digitized signal and the clock signal. The jitter amount is determined by comparing phases between each signal of all T (in the range of 3T to 11T) components contained in the digitized signal and the clock signal and integrating the phase difference thereof. The jitter detection unit 22 may sample just a 3T component from the digitized signal and detect a jitter amount (of 3T) by determining the phase difference between the 3T component and the clock signal. The detected jitter amount is provided to a control unit (controller) 24.

The control unit 24 determines a focusing servo (FS) offset amount and/or a tracking servo (TS) offset amount which minimizes the jitter amount detected by the jitter detection unit, and adjusts an offset value of the focusing servo and/or the tracking servo in the optical pickup 12. Then, the control unit 24 determines the operating state of the optical disk apparatus based on a received mode signal, and switches the boost amount to another one in the equalizer 16 based on the operating state. That is, the boost amount in the equalizer 16 is set to zero in a mode of adjusting the FS offset amount and/or TS offset amount, more specifically, when fabricating or activating the optical disk apparatus, controlling a tilt angle of the optical pickup, adjusting recording conditions during the servo adjustment, or the like, and is switched to a predetermined value (e.g., +20 dB) in a mode wherein the optical disk apparatus performs a normal recording or reproducing operation after completion of adjustment of the FS and/or TS amount. The mode signal is supplied, for example, in response to operation of a button by a user of the optical disk apparatus.

Figure 2:
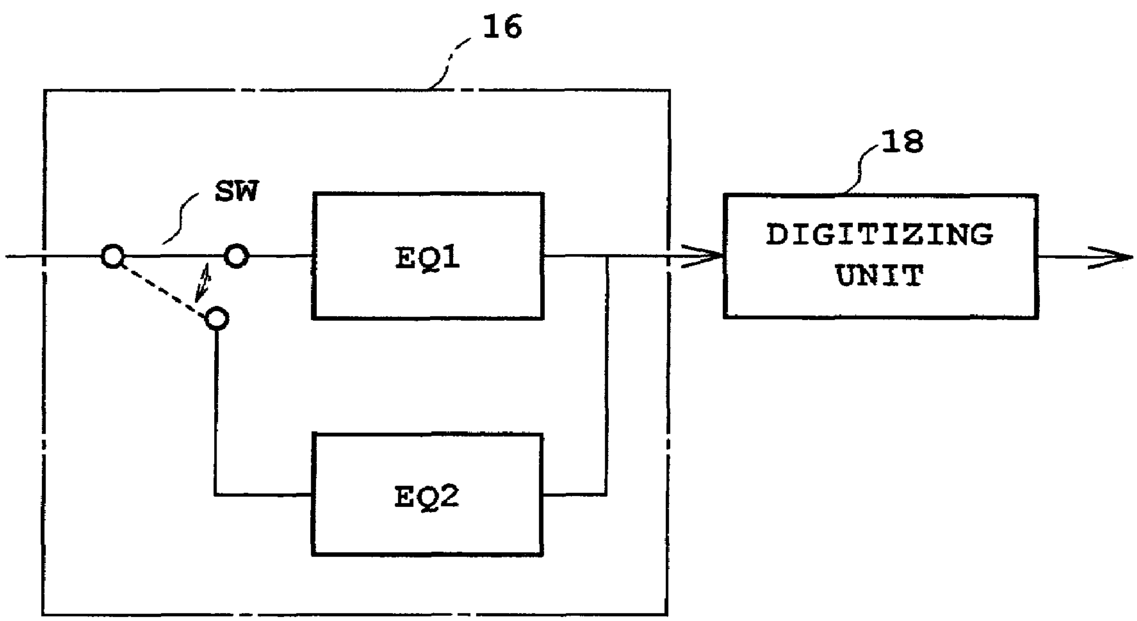
FIG. 2 is a conceptual block diagram of the equalizer in FIG. 1.

FIG. 2 shows a conceptual block diagram of the equalizer in FIG. 1. As noted above, the equalizer 16 is adapted such that a register value is set based on the signal from the control unit 24 and the boost amount can be switched in 1 dB increments within a range of 0 dB to +20 dB. The boost amount is set to 0 dB during adjustment of the optical pickup 12 such that the delay characteristics are flattened through 3T to 11T while the boost amount is set to +20 dB during a recording or reproducing operation and the RF signal is boosted. Thus, the configuration of the equalizer 16 of the present embodiment is equal to the apparatus which comprises two equalizers, an equalizer EQ1 which does not boost an RF signal and an equalizer EQ2 which boosts the component of the RF signal near 3T by as much as +20 dB, and these equalizers are changed over by a switch SW. The switch SW is connected, in response to and in accordance with a signal from the control unit 24, to the equalizer EQ1 side during adjustment of the optical pickup and connected to the equalizer EQ2 side during normal recording or reproduction. Outputs from the equalizers EQ1 and EQ2 are both supplied to the digitizing unit 18. Obviously, adjustment of the boost amounts can be performed using software by setting a register value, and the equalizer 16 can actually be configured as a single unit as shown in FIG. 1.

Figure 3:
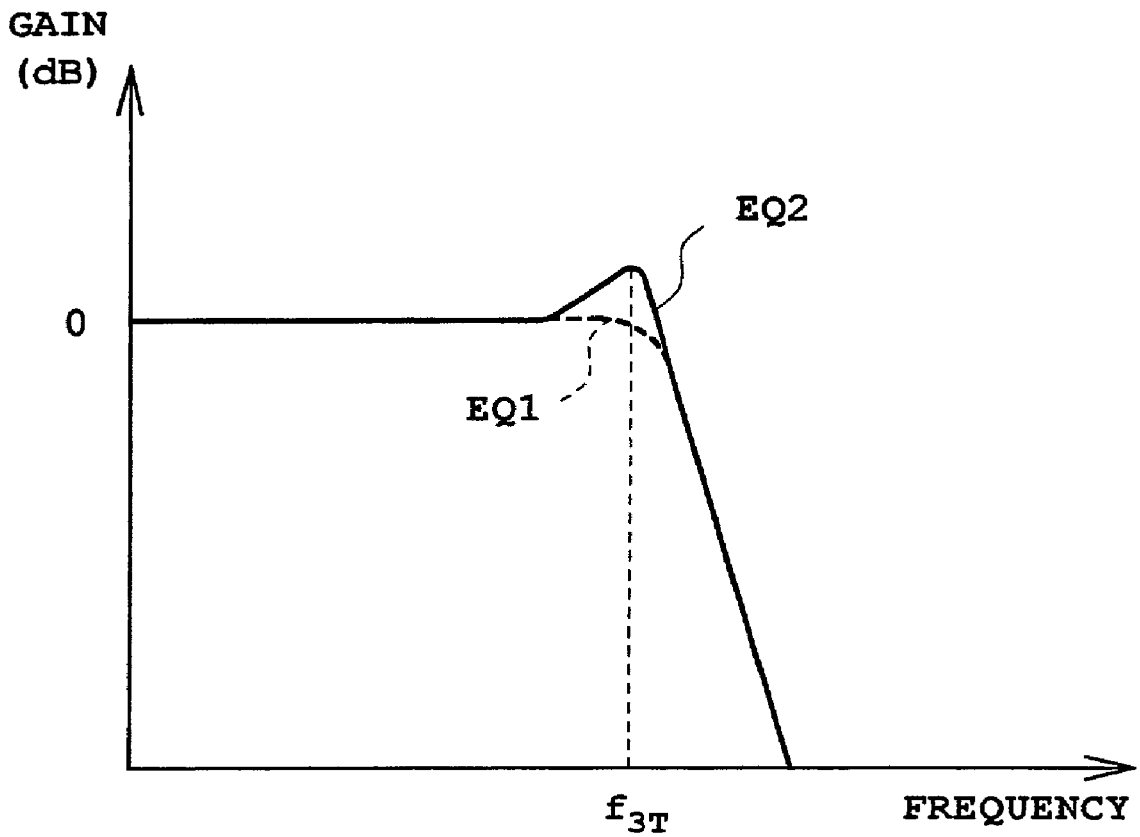
FIG. 3 is a graphical representation of frequency characteristics of the equalizer in FIG. 2.
Figure 4:
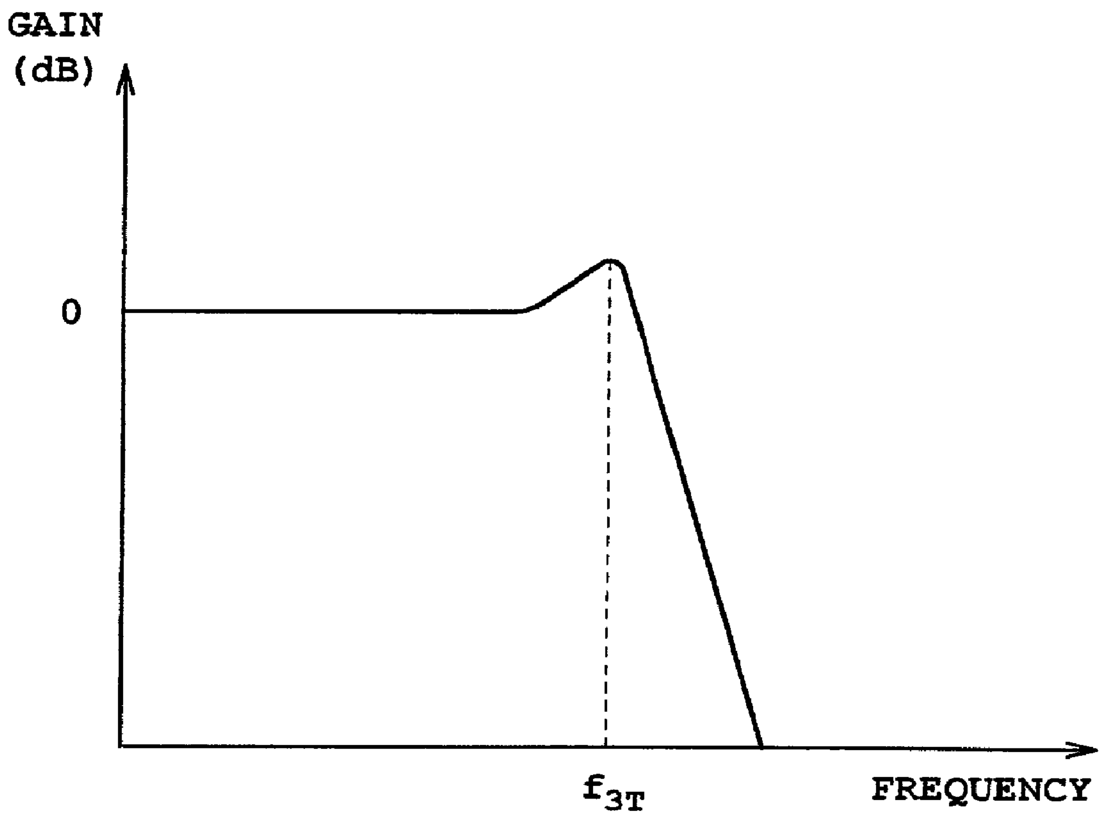
FIG. 4 is another graphical representation of frequency characteristics of the equalizer.
Figure 5:
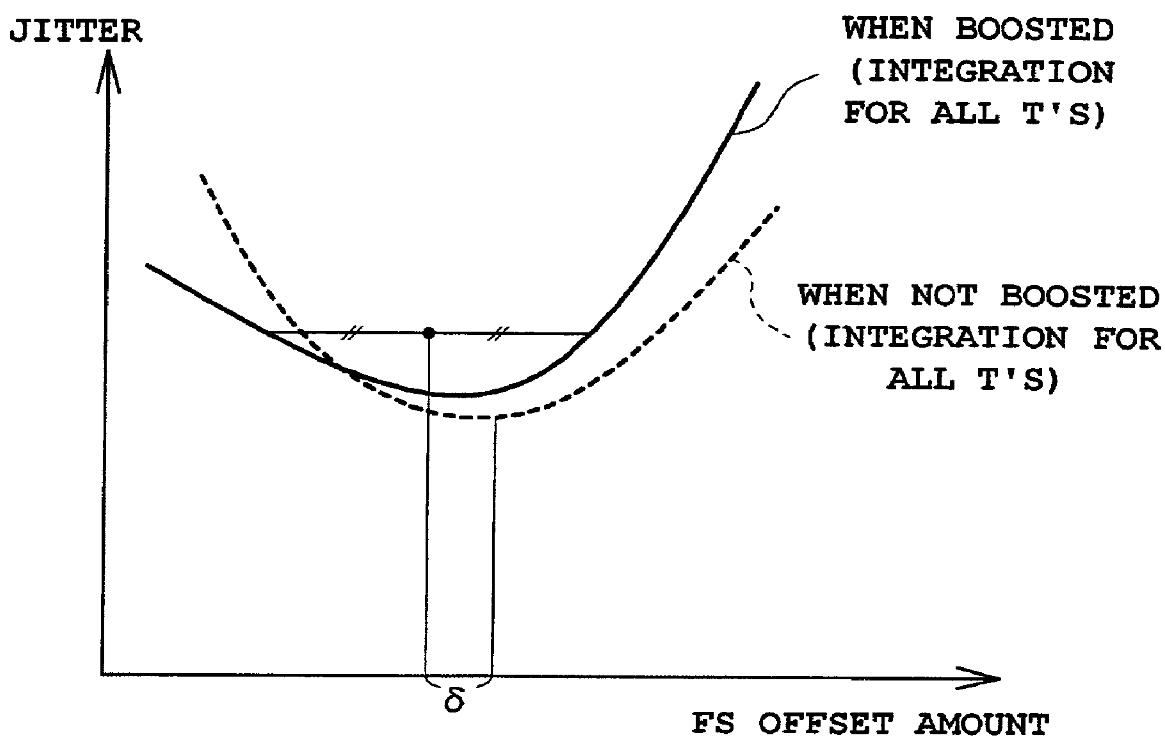
FIG. 5 is a graphical representation showing a relationship between FS offset amount and jitter amount when boosted and when not boosted.

FIG. 3 shows frequency characteristics of the equalizer EQ1 and equalizer EQ2 in FIG. 2. The frequency is plotted on the horizontal axis and the gain is plotted on the vertical axis. The plot for when equalizer EQ1 does not boost the RF signal is shown by the dotted line. As can be seen, the frequency characteristics are flattened. Accordingly, when the signal supplied from the equalizer EQ1 is digitized and a jitter amount based on all Ts is detected from the phase difference between the digitized signal and a clock signal, frequency characteristics as shown by the dotted line in FIG. 5 are obtained. Calculating an intermediate value between two points of generally equal jitter amounts make it possible to precisely determine an FS offset amount and/or TS offset amount which minimizes the jitter amount, and thus to adjust the optical pickup 12. This optimizes the focus of the optical pickup 12 and reduces the laser power of the LF to obtain a desired error rate.

Further, because the equalizer EQ2 boosts a high frequency region (near 3T) of the RF signal by a predetermined value (+20 dB), a reproduction signal is reliably decoded, thereby reducing the error rate.

Thus, instead of fixing the boost amount in the equalizer 16, in accordance with the present embodiment, the boost amount is switched between zero and a predetermined value, and an RF signal having flat delay characteristics is used during adjustment, thereby making it possible to easily optimize the optical pickup.

In this embodiment, the boost amount of the equalizer 16 is switched in two levels: zero and +20 dB. However, the boost amount may be switched in three levels of zero, +10 dB, and +20 dB, or more as needed.

Further, although in this embodiment, the boost amount of the equalize 16 is set to zero during adjustment of the optical pickup 12, the boost amount need not be set exactly to zero but may be set to a sufficiently small amount, which may as much as +1 dB to +2 dB.

What is claimed is:

1. An optical disk apparatus comprising:

an optical pickup for irradiating laser light onto an optical disk, receiving light reflected from the optical disk,and generating an RF signal in response to the received light;

an equalizer for performing a gain adjustment on a predetermined frequency band of the RF signal generated by the optical pickup;

a digitizing unit for digitizing the signal received from the equalizer; and a detector for detecting a jitter of the digitized signal received from the digitizing unit;

wherein the gain amount in the equalizer is switched between a predetermined value and a substantially zero value;

the optical disk apparatus further comprising a controller for switching the gain amount of the equalizer based on a mode signal, wherein the controller sets the gain amount to the substantially zero value in connection with a mode for adjusting the optical pickup and sets the gain amount to the predetermined value in connection with a mode for recording and reproduction.

2. The optical disk apparatus according to claim 1, wherein the controller adjusts an offset amount of one or both of a focusing servo and a tracking servo of the optical pickup based on the jitter amount detected by the detector when the gain amount is set to the substantially zero value.

3. The optical disk apparatus according to claim 1, wherein the detector detects the jitter of the digitized signal for all frequencies therein.

4. The optical disk apparatus according to claim 1, wherein the detector detects the jitter of the digitized signal for a 3T frequency therein.

5. An optical disk apparatus comprising:

an optical pickup for irradiating laser light onto an optical disk, receiving light reflected from the optical disk, and generating an RF signal in response to the received light;

an equalizer which does not boost the RF signal received from the optical pickup while a servo is being adjusted and which does boost a predetermined frequency band of the RF signal received from the optical pickup during recording or reproducing;

a digitizing unit for digitizing the signal received from the equalizer;

a detector for detecting a jitter of the digitized signal received from the digitizing unit; and a controller for adjusting a servo based on the jitter, which is detected by the detector, of the digitized signal not boosted;

wherein the controller calculates an offset amount which minimizes the jitter of the digitized signal not boosted during adjusting a servo, and sets the calculated value as an offset amount of a focus servo and/or a tracking servo of the optical pickup.

6. The optical disk apparatus according to claim 5, wherein the equalizer boosts a 3T frequency of the RF signal during recording or reproducing.

* * * * *

UNITED STATES PATENT AND TRADEMARK OFFICE

CERTIFICATE OF CORRECTION

PATENT NO. : 6,999,388 B2
APPLICATION NO. : 10/131974
DATED : February 14, 2006
INVENTOR(S) : Mashimo et al.

It is certified that error appears in the above-identified patent and that said Letters Patent is hereby corrected as shown below:

| Column | Line | |
|---|---|---|
| 5 | 37 | “disk,and” should read --disk, and-- |
| (Claim 1, | line 3) | |

Signed and Sealed this

Twenty-second Day of August, 2006

JON W. DUDAS

*Director of the United States Patent and Trademark Office*